(12) United States Patent
Forlong (10) Patent No.: US 10,071,454 B2
(45) Date of Patent: Sep. 11, 2018

(54) COOLANT AND CHIP SEPARATOR APPARATUS

(71) Applicant: EIGEN SYSTEMS LIMITED, Hamilton (NZ)

(72) Inventor: Murray Houlton Forlong, Hamilton (NZ)

(73) Assignee: EIGEN SYSTEMS LIMITED, Auckland (NZ)

( * ) Notice: Subject to any disclaimer, the term of this patent is extended or adjusted under 35 U.S.C. 154(b) by 120 days.

(21) Appl. No.: 14/783,809

(22) PCT Filed: Apr. 10, 2014

(86) PCT No.: PCT/NZ2014/000062
§ 371 (c)(1),
(2) Date: Oct. 9, 2015

(87) PCT Pub. No.: WO2014/168491
PCT Pub. Date: Oct. 16, 2014

(65) Prior Publication Data
US 2016/0303695 A1    Oct. 20, 2016

(30) Foreign Application Priority Data
Apr. 12, 2013 (NZ) ...................................... 609390

(51) Int. Cl.
*B01D 45/12* (2006.01)
*B23Q 11/10* (2006.01)
(Continued)

(52) U.S. Cl.
CPC .......... *B23Q 11/1069* (2013.01); *B01D 45/02* (2013.01); *B23K 7/10* (2013.01);
(Continued)

(58) Field of Classification Search
CPC ........... B23Q 11/1069; B23Q 11/0057; B23K 10/00; B23K 26/38; B23K 26/0876;
(Continued)

(56) References Cited

U.S. PATENT DOCUMENTS 2,057,579 A * 10/1936 Kurth ........................ F24F 3/16
261/111
2,585,440 A * 2/1952 Collins .................. B01D 47/06
159/4.01
(Continued)

FOREIGN PATENT DOCUMENTS

CN        201350571 Y    11/2009
JP        2005-81467 A    3/2005
(Continued)

OTHER PUBLICATIONS

Chinese Office Action in corresponding Chinese Patent Application No. CN2014800336720 dated Nov. 16, 2017 (translation) (8 pages).

*Primary Examiner* — Dung H Bui
(74) *Attorney, Agent, or Firm* — Greer, Burns & Crain, Ltd.

(57) ABSTRACT

A separator apparatus is provided for a cutting machine which separates chips from coolant, wherein the separator includes a fluid chamber into which an airborne mixture of chips and coolant driven by an airflow enters via an entry port, the separator apparatus being configured to: sufficiently slow the speed of the airborne mixture once inside the chamber so that the chips and coolant separate out from the airflow; retain the chips and coolant released from the airborne mixture in the fluid chamber; and allow air from the airborne mixture to exit the fluid chamber via an air outlet; wherein the fluid chamber includes a chip collector which captures the chips and enables the chips to be separated and removed from the coolant in the chamber; and wherein the (Continued)

fluid chamber includes a coolant outlet through which coolant, from which the chips have been removed, is able to exit.

20 Claims, 4 Drawing Sheets (51) Int. Cl.
| | | |
|---|---|---|
| *B23Q 11/00* | (2006.01) | |
| *B23K 7/10* | (2006.01) | |
| *B23K 37/02* | (2006.01) | |
| *B23K 37/04* | (2006.01) | |
| *B23K 26/08* | (2014.01) | |
| *B23K 26/38* | (2014.01) | |
| *B01D 45/02* | (2006.01) | |
| *B23K 10/00* | (2006.01) | |

(52) U.S. Cl.
CPC .......... *B23K 10/00* (2013.01); *B23K 26/0876* (2013.01); *B23K 26/38* (2013.01); *B23K 37/0235* (2013.01); *B23K 37/0408* (2013.01); *B23Q 11/0057* (2013.01); *Y02P 70/171* (2015.11)

(58) Field of Classification Search
CPC .. B23K 37/0408; B23K 7/10; B23K 37/0235; B01D 45/02; Y02P 70/171
See application file for complete search history.

(56) References Cited

U.S. PATENT DOCUMENTS

| | | | | |
|---|---|---|---|---|
| 3,163,472 | A * | 12/1964 | Zeismer | A01D 46/08 406/171 |
| 3,624,696 | A * | 11/1971 | Cohen | B01D 47/024 261/118 |
| 3,811,252 | A | 5/1974 | Evans et al. | |
| 4,002,441 | A * | 1/1977 | Johnson | B01D 47/10 261/109 |
| 4,165,973 | A * | 8/1979 | Stergiou | B01D 47/06 261/118 |
| 4,263,024 | A * | 4/1981 | Vander Velden | B01D 47/10 239/565 |
| 4,727,785 | A * | 3/1988 | Taguchi | B23D 55/043 408/56 |
| 5,026,221 | A | 6/1991 | Arai et al. | |
| 5,624,579 | A * | 4/1997 | Bratten | B01D 29/096 210/387 |
| 6,355,167 | B1 | 3/2002 | Wensauer | |
| 7,410,569 | B1 * | 8/2008 | Tilev | B01D 21/0012 210/167.02 |
| 8,470,183 | B2 * | 6/2013 | DeWaard | B01D 21/2461 198/666 |
| 9,415,475 | B2 * | 8/2016 | Tak | B23Q 11/0057 |
| 9,623,532 | B2 * | 4/2017 | Forlong | B23Q 11/1069 |
| 2003/0000552 | A1 | 1/2003 | Bratten | |
| 2015/0023752 | A1* | 1/2015 | Matsuyama | B23Q 11/0057 409/137 |
| 2016/0114981 | A1* | 4/2016 | Matsuyama | B65G 19/10 198/728 |
| 2016/0303695 | A1* | 10/2016 | Forlong | B23Q 11/0057 |
| 2016/0354887 | A1* | 12/2016 | Kakutani | B23Q 11/0067 |

FOREIGN PATENT DOCUMENTS

| | | |
|---|---|---|
| KR | 10-0925947 B1 | 6/2009 |
| KR | 20110103745 | 9/2011 |
| KR | 10-2012-0080269 A | 7/2012 |

* cited by examiner

COOLANT AND CHIP SEPARATOR APPARATUS

BACKGROUND

The invention relates to a coolant and chip separator apparatus. In particular, the invention relates to an apparatus to enable waste coolant and metal machining chips, produced during machining processes, to be separated so that the coolant can be reused on the machine and the chips dumped to waste.

The present invention has particular application to plate cutting machines which utilise a cutting head requiring a liquid coolant known in the art as 'wet cutting'. However, it should be understood that the present invention also has application to wet cutting machines which may also be adapted to additionally undertake thermal cutting (i.e. dry cutting) operations.

On some metal plate cutting machines capable of both wet and dry cutting, the bridge of the cutting machine may be fitted with dry cutting tools such as laser, oxy fuel and/or plasma cutting torches to produce the part profile and sever the part from the parent plate, as well as one or more spindles capable of high speeds for machining operations such as milling, drilling, counterboring, tapping, threading and related operations.

Currently these machines do not incorporate a method of removing and separating the chips (aka swarf) and coolant used in machining operations and lack the ability to reuse coolant. Typically, the chips and coolant are left on the plate being cut or fall into the table supporting the plate, requiring manual removal at a later time.

Some previous attempts to solve this problem have involved the use of multiple separate devices to perform different separation processes. Such systems are disadvantageous in that they are expensive to produce and maintain as well as taking up a large amount of space.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is one object of the present invention to provide an improved apparatus for separating used coolant from the chips produced during machining operations. Another particular object is to separate the chips and eject to a waste container to enable the coolant to be reused.

It will be appreciated that other advantages and objects of the invention may be inherent in the invention as claimed, although not specifically detailed herein.

Alternatively, it is an object of the present invention to address at least one of the disadvantages of the prior art, or at least provide the public with a useful choice.

SUMMARY

According to a first aspect of the present invention there is provided a separator apparatus for a cutting machine which separates chips from coolant, wherein the separator includes a fluid chamber into which an airborne mixture of chips and coolant driven by an airflow enters via an entry port, said separator apparatus being adapted to:

sufficiently slow the speed of the airborne mixture once inside said chamber so that the chips and coolant separate out from the airflow;

retain the chips and coolant released from the airborne mixture in the fluid chamber; and allow air from the airborne mixture to exit the fluid chamber via an air outlet;

wherein said fluid chamber includes a chip collector which captures the chips and enables the chips to be separated and removed from said coolant in the chamber; and wherein said fluid chamber includes a coolant outlet through which coolant, from which the chips have been removed, is able to exit.

Preferably, the chips and coolant fall from the airflow.

Preferably, in use, the fluid chamber is connected via a duct system to at least one airflow driving device which drives the airborne mixture towards and through said fluid chamber and causes air to exit said fluid chamber once coolant and chips have separated out from said airflow.

Preferably, the separator includes a diffuser located proximately upstream of said entry port, adapted to slow the flow of the airborne mixture before it enters the fluid chamber.

Preferably, the chip collector comprises:

a conveyor travelling within a chip conduit; and at least one tapered surface which captures the chips and directs them through an opening at the lower end of the tapered surface and through an opening in the chip conduit and onto the conveyor for exit from the fluid chamber.

Preferably, the at least one tapered surface is in the form of a funnel.

Preferably, the chip collector allows coolant to pass the opening in the chip conduit.

Preferably, the separator apparatus comprises one or more filters associated with the air outlet, the filters adapted to prevent oil and/or particles from exiting the fluid chamber along with the air.

In some embodiments, the entry port is located at the top of the chamber. In other embodiments, the entry port is located on a side of the chamber.

In some embodiments, the air outlet is located at the top of the fluid chamber. In other embodiments, the air outlet is located on a side of the chamber.

Preferably, there is a partition within the fluid chamber between the entry port and air outlet adapted to direct the incoming chips and coolant away from the air outlet, while allowing the air to flow to the air outlet. More preferably, the partition is in the form of louvres.

According to a second aspect of the present invention there is provided a method for separating chips and coolant from an airborne mixture of air, chips and coolant created as part of a plate metal machining operation using coolant said method including the steps of:

subjecting the airborne mixture having an airflow speed V to a speed reduction step to have a speed V2 as it enters, or upon entering, a fluid chamber—wherein speed V2 is sufficient to cause the coolant and chips to separate out of said airflow; and separating coolant and chips from one another via respective weight and size differences between the coolant and the chips.

According to a third aspect of the present invention there is provided a cutting machine comprising a separator apparatus as claimed in any one of the previous claims.

The invention may also be said broadly to consist in the parts, elements and features referred to, or indicated in, the specification of the application, individually or collectively, in any or all combinations of two or more of said parts, elements or features.

BRIEF DESCRIPTION OF THE DRAWINGS

The invention will now be described, by way of example only, by reference to the accompanying drawings.

DETAILED DESCRIPTION

The following description will describe the invention as shown in FIGS. 1-7 in relation to preferred embodiments of the invention—a separator apparatus for separating chips from coolant for a plate cutting machine comprising a dry cutting system and a machining system having through spindle coolant, able to recover coolant for re-use.

The term "cutting" as used herein refers to material removal operations such as laser cutting, oxyfuel cutting, plasma cutting and similar or related profile cutting processes, as well as machining operations such as milling, drilling, tapping, threading and related processes.

The term "dry cutting" as used herein refers to operations in which no coolant is used such as laser, oxy fuel and plasma cutting.

The term "coolant" as used herein refers to the liquid often used during machining, and so in addition to water (or another liquid used to absorb heat) it may also comprise oil or other liquids as may be used to improve a machining operation. For example, by providing lubrication to prolong the life of the cutting tool.

In preferred embodiments of the invention, a separator apparatus is provided which is fluidly connected to a machine tool, such as a plate cutting machine, milling machine, lathe or any machine tool which uses coolant and produces chips. The separator apparatus receives an airborne mixture of chips and coolant from the machine, captures the chips and coolant and separates them so that the coolant can be reused, and the chips discarded.

Figure 1:
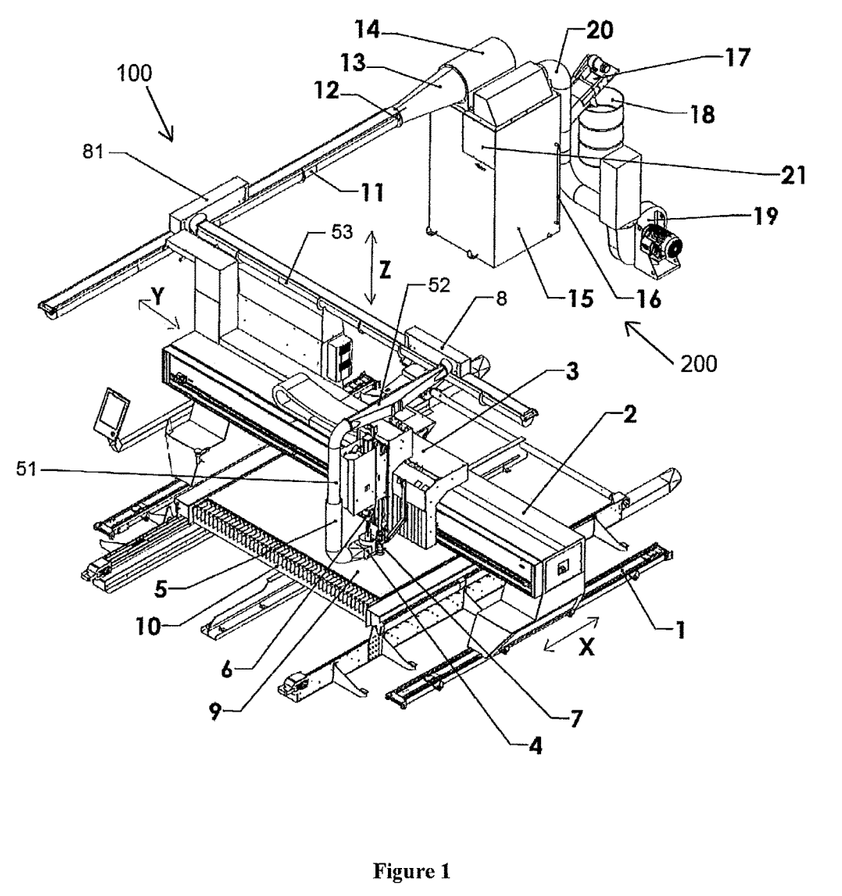
FIG. 1 is a perspective view illustration of an apparatus according to an embodiment of the invention.
Figure 2:
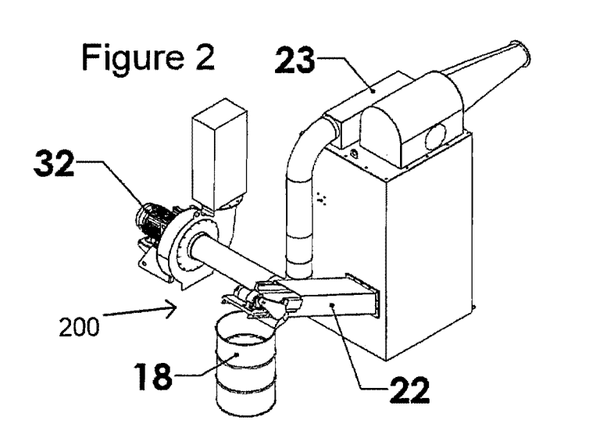
FIG. 2 is an isometric view illustration of a coolant and chip separator system according to the embodiment of the invention shown in FIG. 1.
Figure 3:
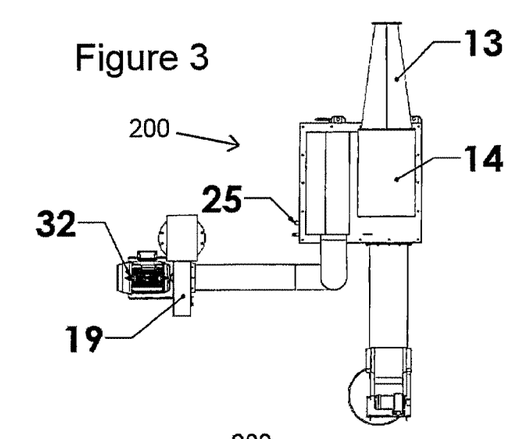
FIGS. 3-5 are three orthographic view illustrations of a system according to the embodiment of the invention shown in FIGS. 1 and 2.
Figure 4:
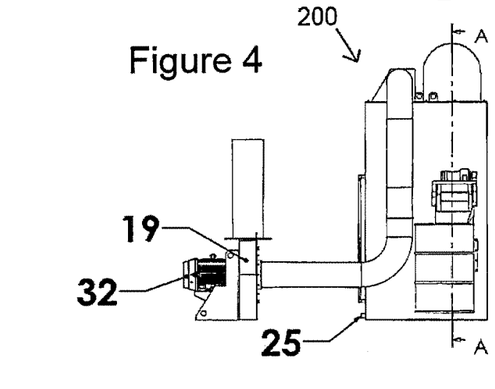
Figure 5:
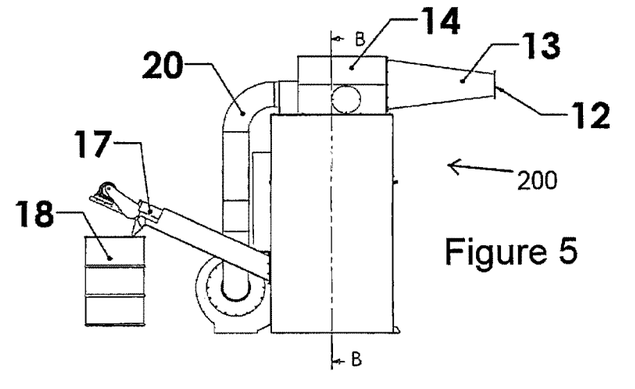

FIG. 1 shows a plate cutting machine 100 having both machining and thermal cutting capability, to which a separator apparatus 200 is connected. The plate cutting machine 100 is adapted to cut or machine metal plate 9 supported on cutting table 10.

The plate cutting machine 100 shown in FIG. 1 comprises a gantry 2 that can travel in an X axis along machine rails 1 in a substantially horizontal plane. The machine rails 1 can be located on the ground or floor. A carriage 3 is mounted to the gantry 2 and is fitted with a spindle 6 to drive a cutting tool such as a milling cutter, drill bit, counterbore, tap, die, among other possibilities, and a thermal cutting head 7 to perform dry cutting. The carriage 3 travels in a substantially horizontal plane in a Y axis along the gantry 2. In this embodiment the spindle 6 has through spindle coolant applied to the cutting tool. The thermal cutting head 7 is in this embodiment a plasma torch (hoses to this cutting torch are removed for clarity).

Both spindle 6 and thermal cutting head 7 can also be moved vertically and so each is fitted with individual Z axis drives to raise and lower each cutting tool substantially vertically in the Z axis relative to the plate 9.

In this preferred embodiment the cutting machine 100 also enables a fume extraction apparatus (not shown) to be mounted under the cutting table 10 for fume extraction during the dry cutting processes, for example plasma cutting.

In this preferred embodiment the plate cutting machine 100 comprises a coolant guard 4 around the machining cutting tool to provide a containment area for the waste produced during the machining process.

The waste is contained by coolant guard 4 which can be clamped to the top surface of plate 9 to create a full or partial seal with the plate 9 on the cutting table 10 in order to prevent coolant from escaping from the proximity of the cutting tool, while still allowing machining operations to be performed.

An airflow can be generated by an airflow driving device in the form of a fan 19 such that the coolant and chips generated by the machining operation can be evacuated from coolant guard 4 as an airborne mixture of chips and coolant up duct 5, up duct 51, along duct 52 to junction 8, along duct 53 to junction 81 and along duct 11 to an inlet connection 12 to the separator apparatus 200.

FIGS. 2-5 show a separator apparatus 200 according to a preferred embodiment of the invention without connection to a machine or incoming coolant and chip waste ducting.

The separator apparatus 200 has a fluid chamber 15 within, and has an inlet diffuser in the form of a cone 13 (horizontally oriented) transferring incoming coolant and chip waste to entry port 14, which is an opening located at the top of the fluid chamber 15, and slowing the velocity of the airborne mixture of chips and coolant as it enters the separator apparatus. The cross sectional area of the downstream end of cone 13 is significantly larger than the upstream end to reduce the velocity of the incoming airborne mixture to a manageable speed low enough such that the coolant and chips can fall out of the air and into the chamber. Duct 11 therefore has a smaller diameter or cross section than entry port 14. The diffuser advantageously allows the airborne mixture of chips and coolant to have a high velocity while approaching the separator apparatus 200, yet have a low enough velocity within the separator apparatus so that the solids and liquids (i.e. chips and coolant) are able be separated within the separator apparatus.

It is advantageous for the airborne mixture of coolant and chips to be moving at a low velocity within the fluid chamber 15, in order for the coolant and chips to be able to fall from the air and be captured, even though the air is able to continue in a flow out of the fluid chamber 15. The diffuser in the form of cone 13 provides a first reduction in velocity of the airborne mixture, and then there is a second reduction in velocity of the airborne mixture as it enters the fluid chamber via entry port 14. This second reduction in velocity, caused by the larger volume/cross section inside the fluid chamber compared to the cone 13, provides further assistance to slow the velocity of the airborne mixture and allow chips and coolant to fall from the air and be collected. Air then exits fluid chamber 15 via air outlet 23 as a consequence of being drawn out by fan 19 which is connected to the fluid chamber by duct 20.

Figures 6, 7:
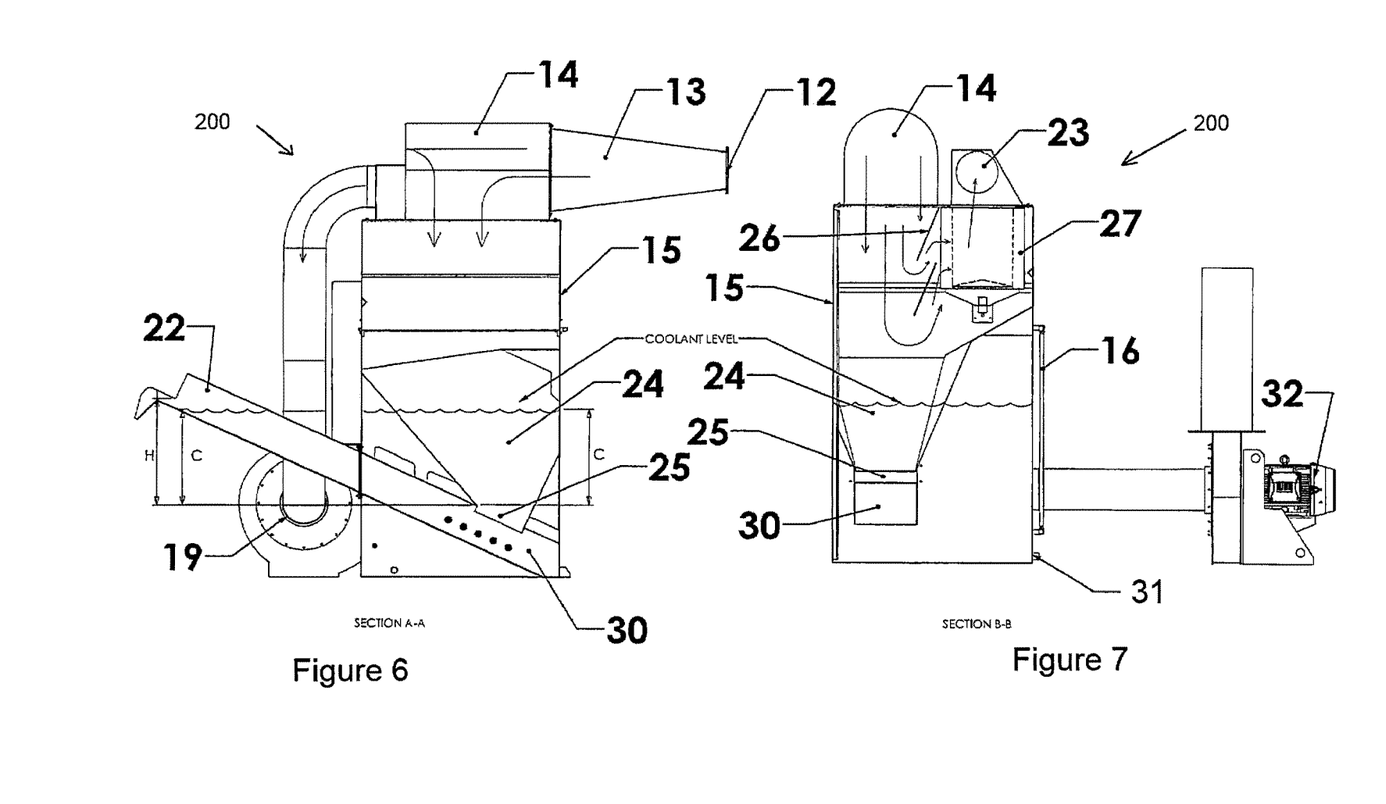
FIG. 6 is a cross-section view illustration A-A of a system according to the embodiment of the invention shown in FIGS. 1-5.
FIG. 7 is a cross-section view illustration B-B of a system according to the embodiment of the invention shown in FIGS. 1-6.

FIG. 6 shows a view of Section A-A showing some internal components of the separator apparatus 200. The airborne mixture is drawn through by the flow created by fan 19, and enters inlet connection 12 and then is slowed down as it passes through cone 13 before entering entry port 14. The coolant and chips from the airborne mixture then fall down into the fluid chamber as a result of a reduction in speed of the airborne mixture entering the chamber. The chips and coolant fall into a chip collector in the form of a conveyor 17 and funnel 24 arrangement. The funnel 24 feeds conveyor 17 via opening 25. The conveyor 17 exits the chamber extending on an incline within a chip conduit 22.

FIG. 7 shows Section B-B, illustrating another view of inside the fluid chamber 15. Below entry port 14 are louvres 26, and below air outlet 23 are filters 27. The airborne mixture of chips and coolant flows around the vanes 26, through filters 27 and then vertically up into air outlet 23, while the chips and coolant fall together into the funnel 24. The airborne mixture is drawn in this direction by fan 19.

The louvres 26 help prevent coolant and chips from physically making contact with the filters 27 after entering the chamber 15, ensuring they fall downwards into funnel 24. The filters 27 remove oil within the air and prevent particles from passing through air outlet 23 and leaving the system. The filters 27 are cylindrical with inner cylindrical voids aligned with holes (not shown) through which the filtered air can enter air outlet 23 and leave the system. The filters 27 are accessible via a removable side cover 21.

While the chips are removed by the conveyor 22, the coolant collected in the lower region of the fluid chamber 15 can be removed at coolant outlet 31 via a coolant pump (not shown) and pumped to a reservoir (not shown) or returned directly to the spindle for reuse.

The opening 25 in the funnel 24 directs the collected chips onto the conveyor 17, yet does not prevent coolant from entering and being collected within the parts of the fluid chamber 15 that are not occupied by the funnel 24 or chip conduit 22. The chip collector therefore allows coolant to pass the opening in the chip conduit.

FIGS. 6 and 7 show the coolant level within the separator apparatus 200, which is at the same level in both the funnel 24 and the rest of the chamber formed by the internal volume of fluid chamber 15.

FIG. 7 also shows a sight gauge 16 to indicate the level of coolant in the chamber. The coolant level may be lower than the height of the open end of chip conduit 22 (i.e. distance C on FIG. 6 is less than distance H) to prevent coolant from spilling out of the open end of chip conduit 22.

When fan 19 is turned on there may be a lower pressure within the fluid chamber 15 than in the surroundings, causing the coolant level within the fluid chamber to increase and the coolant level within the chip conduit 22 to decrease. The amount of coolant in the system may be kept high enough such that distance C (measured when the fan 19 is turned off) is greater than the decrease in coolant level within chip conduit 22 that will occur when fan 19 is turned on. This provides the advantage that air from the surroundings is not sucked from the chip conduit 22 through opening 25 of the funnel 24 and into the inside of the fluid chamber 15 when the fan 19 is turned on.

Figure 8:
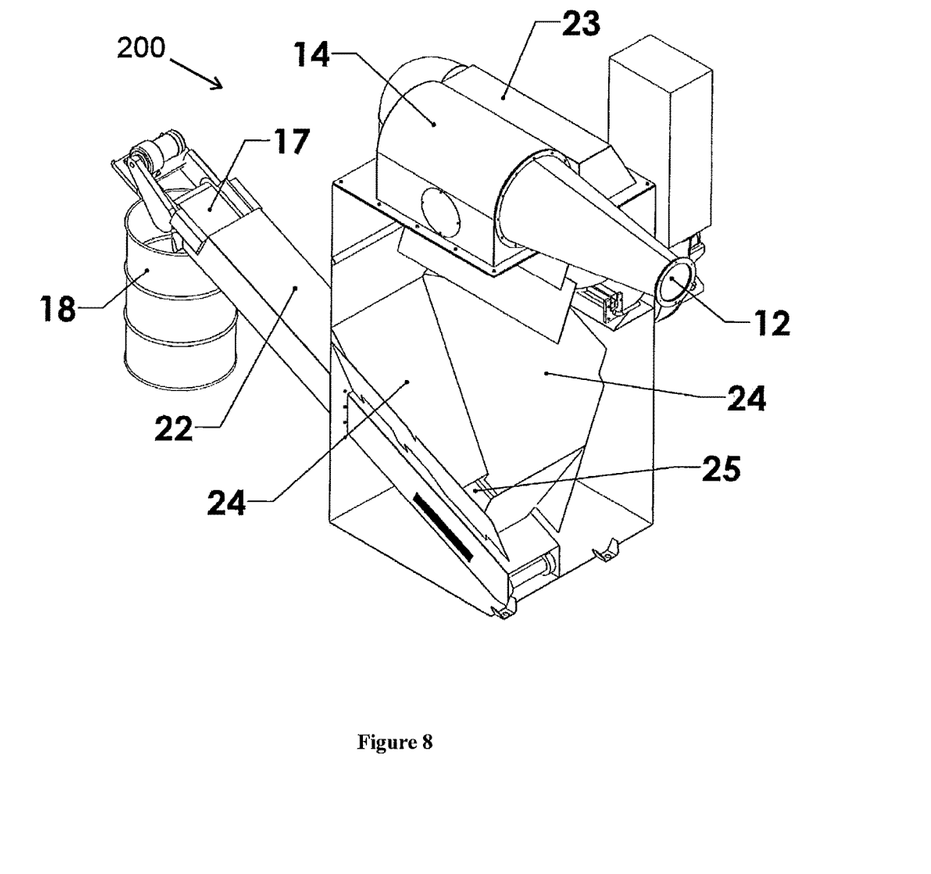
FIG. 8 is an isometric view illustration of a coolant and chip separator system according to the embodiment of the invention shown in FIG. 1-7, with two sides removed to show internal parts of the system.

FIG. 8 shows an isometric view of the fluid chamber 15 of coolant and chip separator system 200 with two sides removed to show details of the funnel 24 and other features. The funnel 24 in this embodiment comprises tapered planar guides that collect and direct the chips down to opening 25 so that the chips fall onto a conveyor 17, in the form of a conveyor belt which is driven so that the chips travel upwards within the chip conduit 22 on the conveyor belt and ultimately fall off the conveyor belt into a receptacle associated with the chip conduit 22, in the form of waste drum 18.

Embodiments of the present invention may have one or more of the following advantages (this list is not intended to be exhaustive):

a) Coolant from machining processes can be evacuated along with chip waste and can be separated so that the coolant can be recycled for reuse in machining operations;
b) Waste generated by machining processes can be evacuated with coolant so that the waste is deposited in a waste container automatically;
c) Uses less coolant than before;
d) Cost savings for coolant;
e) No need to have a large bath to capture of the waste;
f) No need for manual removal of waste directly from the machine;
g) Can be used with a water or wet cutting table machine or on a dry cutting machine;
h) Can be used on a machine with a machining spindle and no other cutting heads; and/or
i) Can be used in any cutting or milling machine that uses a coolant.

Alternative ways in which the present invention may be implemented

In some embodiments, the present invention may be applied to separate coolant and chips produced by a machine with machining capability only (i.e. without any dry cutting tools such as laser, oxy fuel or plasma cutting heads).

The separator apparatus may be adapted to slow the speed of the incoming airborne mixture so that chips and coolant separate out of the airflow in a variety of different ways without departing from the scope of the present invention.

In one embodiment the apparatus may include at least one diffuser which is proximate the entry port.

In another embodiment the apparatus may have a fluid chamber which is dimensioned to sufficiently reduce the speed of the incoming airborne mixture, taking into account the volume of the incoming supply duct, compared to the volume of the portion of the fluid chamber into which the airflow enters.

The aforementioned reduction in speed of the airflow may in some embodiments cause the chips and coolant to fall out of the airflow/airborne mixture.

In some embodiments the fluid chamber may contain a quantity of coolant therein to which the airborne mixture is delivered. As a consequence of having to pass through the coolant retained in the fluid chamber the speed of the airborne mixture is reduced and the chips and coolant separate from the liquid bound airflow.

The separator apparatus may be adapted to retain the chips and coolant therein once they separate out of the airflow in a number of different ways without departing from the scope of the present invention.

In one embodiment the fluid chamber may have at least one wall which is dimensioned to provide a volume and depth which enables the coolant and chips to collect in a bottom region thereof and whilst air circulates in a top region thereof proximate an air outlet.

In another embodiment the fluid chamber may include at least one tapered surface therein to direct the coolant and chip falling out from the airflow into a collection area of said fluid chamber. Such a tapered surface may form part of a chip collector in some embodiments.

In general the fluid chamber may be fluid tight so that coolant and air can only exit via at least one air outlet. However, in some embodiments the fluid chamber may only be fluid tight in the bottom region thereof where coolant and chips are collected.

The separator apparatus may be adapted to allow air to exit, once the coolant and chips have been separated out of the airflow carrying the airborne mixture, in any number of ways within the scope of the present invention.

In one embodiment the separator apparatus may include a chamber which has a top region which is sectioned with a partition so that:
  the incoming airflow is slowed in a first section of the top region so that the coolant and chips can fall from the airflow; and
  then the airflow moves to the second section after passing under said partition to a second section which has an opening to allow air to exit the apparatus.

In another embodiment the separator apparatus may include at least one air outlet. Preferably, said air outlet is connected to at least one duct.

In some embodiments a coolant filter (not shown) is provided as part of the system, such that after coolant is removed from the fluid chamber it passes through the filter to improve the composition of the coolant.

The chip collector may have a number of different configurations without departing from the scope of the present invention.

In another embodiment the chip collector may be a conveyor apparatus which collects and transports chips out of the coolant.

In some embodiments, the separator apparatus may comprise a chip collector formed by any number of tapered walls, or in the form of a funnel. In some embodiments the chip collector may comprise a region formed by vertical walls without tapering, and the conveyor may be wide enough to collect all chips falling within the vertical walls.

In some embodiments parts of the chip collector may be in the form of a mesh adapted to catch chips yet allow coolant to pass, such that the chips can be retained and/or directed onto a conveyor or other means to remove them from the fluid chamber.

In some embodiments the chip collector may comprise a container that is able to collect chips but not coolant, for example a mesh container or tray than can be manually or automatically emptied, for example via a door in the fluid chamber above the coolant level.

In some embodiments there may be alternative types of conveyors used, for example screw conveyors. In further embodiments there may be no conveyor or chip conduit, and the chips may be removed manually by shovelling out an opening in the fluid chamber.

In some embodiments of the invention the system may be installed a distance from a machine it is connected to, in which case the ducting that transfers the waste coolant and chips from the machine to the separation system may be positioned more conveniently at floor level. Furthermore, chips and coolant may be removed from some machines at floor level, in which case the ducting to a separator apparatus may run along the floor.

In cases such as the above it is inefficient to pump the waste from floor level upwards all the way to the top of the separator system, and so in some embodiments the diffuser and receiver duct are positioned on the side of the fluid chamber rather than on the top. The chips and coolant can then enter the fluid chamber and fall downwards, while the air within the mix flows upwards to the air outlet, preferably via filters.

While the coolant and chip separator system is described at times with reference to a machine with both thermal cutting capability and machining capability, the system is not limited to the machine it is used with, and the machine may not comprise thermal cutting capability such as laser, oxyfuel or plasma cutting heads. In some embodiments the system may receive coolant/air/chip waste produced by multiple machines.

While a preferred embodiment of the invention involves the separation of air, coolant and chips, it will be clear that in other embodiments the invention may be applied to separate any suitable mixture of gas, liquid and solids.

In some embodiments the airflow driving device may not be a fan creating a vacuum downstream of the desired flow direction, but instead may be a compressed air source, for example near the cutting tool that forces a flow of an airborne mixture of chips and coolant from the cutting machine to the separator apparatus.

It will also be understood that where a product, method or process as herein described or claimed and that is sold incomplete, as individual components, or as a "kit of Parts", that such exploitation will fall within the ambit of the invention.

Aspects of the present invention have been described by way of example only and it should be appreciated that modifications and additions may be made thereto without departing from the scope of the appended claims.

I claim:

1. A separator apparatus for a cutting machine which separates chips from coolant, wherein the separator apparatus includes a fluid chamber into which an airborne mixture of chips and coolant driven by an airflow enters via an entry port, said separator apparatus being configured to:
  sufficiently slow the speed of the airborne mixture once inside the fluid chamber so that the chips and coolant separate out from the airflow;
  retain the chips and coolant released from the airborne mixture in the fluid chamber; and
  allow air from the airborne mixture to exit the fluid chamber via an air outlet;
  the separator apparatus comprising:
  a chip collector which captures the chips and enables the chips to be separated and removed from the coolant in the fluid chamber, wherein the chip collector comprises:
  a conveyor travelling within a chip conduit, at least part of the chip conduit being within the fluid chamber and substantially enclosing the conveyor within the fluid chamber; and
  at least one tapered surface which captures the chips and directs the chips through an opening in the chip conduit and then onto the conveyor for exit from the fluid chamber; and
  wherein the fluid chamber includes a coolant outlet through which coolant, from which the chips have been removed, is able to exit.

2. The separator apparatus as claimed in claim 1, wherein the chips and coolant fall from the airflow.

3. The separator apparatus as claimed in claim 1, wherein, in use, the fluid chamber is connected via a duct system to at least one airflow driving device which drives the airborne mixture towards and through said fluid chamber and causes air to exit said fluid chamber once coolant and chips have separated out from said airflow.

4. The separator apparatus as claimed in claim 1, wherein the separator includes a diffuser located proximately upstream of said entry port, adapted to slow the flow of the airborne mixture before entering the fluid chamber.

5. The separator apparatus as claimed in claim 1, wherein the at least one tapered surface is formed as a funnel.

6. The separator apparatus as claimed in claim 1, wherein the chip collector allows coolant to pass the opening in the chip conduit.

7. The separator apparatus as claimed in claim 1, wherein the separator apparatus comprises one or more filters associated with the air outlet, the filters configured for preventing oil and/or particles from exiting the fluid chamber along with the air.

8. The separator apparatus as claimed in claim 1, wherein the entry port is located at the top of the fluid chamber.

9. The separator apparatus as claimed in claim 1, wherein the entry port is located on a side of the fluid chamber.

10. The separator apparatus as claimed in claim 1, wherein the air outlet is located at the top of the fluid chamber.

11. The separator apparatus as claimed in claim 1, wherein the air outlet is located on a side of the fluid chamber.

12. The separator apparatus as claimed in claim 1, wherein there is a partition within the fluid chamber between the entry port and air outlet adapted to direct incoming chips and coolant away from the air outlet, while allowing the air to flow to the air outlet.

13. The separator apparatus as claimed in claim 12, wherein the partition is formed as louvres.

14. A cutting machine comprising a separator apparatus as claimed in claim 1.

15. The separator apparatus as claimed in claim 1, wherein the chip collector defines a first volume interior to the chip collector and a second volume exterior to the chip collector within the fluid chamber, wherein the chip collector substantially prevents chips from passing from the first volume to the second volume.

16. A method for separating chips and coolant from an airborne mixture of air, chips and coolant created as part of a plate metal machining operation using coolant, the method comprising:

subjecting the airborne mixture having an airflow speed V to a speed reduction step to have a speed V2 as it enters, or upon entering, a fluid chamber, wherein speed V2 is sufficient to cause the coolant and chips to separate out of said airflow;

capturing the chips within the fluid chamber using at least one tapered surface, the tapered surface directing the chips through an opening in a chip conduit extending within the fluid chamber, the chip conduit substantially enclosing a conveyor within the chip conduit, and then onto the conveyor travelling within the chip conduit; and separating coolant and chips from one another via respective weight and size differences between the coolant and the chips.

17. A separator apparatus for a cutting machine which separates chips from coolant, wherein the separator apparatus includes a fluid chamber into which an airborne mixture of chips and coolant driven by an airflow enters via an entry port, said separator apparatus comprising:

a chip collector in the fluid chamber that captures the chips and enables the chips to be separated and removed from the coolant in the fluid chamber, wherein the chip collector comprises:

a chip conduit enclosing a majority of a conveyor within the fluid chamber, said chip conduit having an opening, wherein the conveyor travels within said chip conduit; and a funnel within the fluid chamber provided above the opening in the chip conduit, said funnel including at least one tapered surface which captures the chips and directs the chips through said opening in the chip conduit and then onto the conveyor for exit from the fluid chamber.

18. The separator apparatus as claimed in claim 17, wherein the funnel is attached to one of more side walls of the fluid chamber.

19. The separator apparatus as claimed in claim 17, wherein the opening in the chip conduit comprises a width less than a width of the fluid chamber.

20. The separator apparatus as claimed in claim 17, wherein the fluid chamber comprises one or more side walls defining the fluid chamber and the funnel is located inwardly of the one or more side walls to allow coolant to occupy a volume of the fluid chamber between the funnel and the one or more side walls of the fluid chamber.

* * * * *